US011433429B2

(12) United States Patent
Ma et al.

(10) Patent No.: US 11,433,429 B2
(45) Date of Patent: Sep. 6, 2022

(54) LOGISTICS SORTING SYSTEM AND LOGISTICS SORTING METHOD

(71) Applicant: Shenzhen Dorabot Inc., Guangdong (CN)

(72) Inventors: Shengyuan Ma, Guangdong (CN);
Qiyang Liu, Guangdong (CN);
Xinghao Liang, Guangdong (CN); Yun Zhao, Guangdong (CN); Ilia Vasilev, Guangdong (CN); Hailiang Zhang, Guangdong (CN); Shi Jie Looi, Guangdong (CN)

(73) Assignee: Shenzhen Dorabot Inc., Shenzhen (CN)

( * ) Notice: Subject to any disclaimer, the term of this patent is extended or adjusted under 35 U.S.C. 154(b) by 475 days.

(21) Appl. No.: 16/538,852

(22) Filed: Aug. 13, 2019

(65) Prior Publication Data

US 2020/0055091 A1    Feb. 20, 2020

(30) Foreign Application Priority Data

Aug. 17, 2018  (CN) .......................... 201810941735.2
Nov. 8, 2018   (CN) .......................... 201811326328.7
Nov. 8, 2018   (CN) .......................... 201811327310.9

(51) Int. Cl.
*B07C 3/08*    (2006.01)
*B07C 5/36*    (2006.01)

(52) U.S. Cl.
CPC ........ *B07C 3/08* (2013.01); *B07C 2501/0063* (2013.01); *G05B 2219/45047* (2013.01); *G05B 2219/50391* (2013.01)

(58) Field of Classification Search
CPC .. B07C 3/08; B07C 3/003; B07C 3/10; B07C 3/14; B07C 2501/0063; B07C 5/36; B07C 5/04; B07C 5/08; G05B 2219/45047; G05B 2219/50391; G05B 2219/50392
USPC .......................................... 700/224
See application file for complete search history.

(56) References Cited

U.S. PATENT DOCUMENTS

| 2016/0263622 A1* | 9/2016 | El Bernoussi | ......... B25J 9/1687 |
| 2016/0332823 A1* | 11/2016 | Yang | ...................... B65H 33/16 |
| 2018/0127219 A1* | 5/2018 | Wagner | .................. B65G 47/40 |

FOREIGN PATENT DOCUMENTS

| CN | 105292892 A | * | 2/2016 | |
| CN | 105292892 A | | 2/2016 | |
| CN | 105293088 A | | 2/2016 | |
| CN | 205879313 U | | 1/2017 | |
| CN | 206604779 U | | 11/2017 | |
| CN | 107470161 A | * | 12/2017 | ............... B07C 1/04 |
| CN | 107511338 A | * | 12/2017 | |
| CN | 107886275 A | | 4/2018 | |

(Continued)

OTHER PUBLICATIONS

International Search Report of PCT Patent Application No. PCT/CN2019/113729 dated Jan. 23, 2020.

*Primary Examiner* — Gene O Crawford
*Assistant Examiner* — Muhammad Awais

(57) ABSTRACT

A logistics sorting system and a logistics sorting method, and the logistics sorting system comprises: the transport module, the sorting module, the identification module, the plurality of storage modules, the central controller connecting electrically with the transport module, the identification module, the sorting module, and the plurality of the storage modules respectively.

18 Claims, 8 Drawing Sheets

(56) References Cited

FOREIGN PATENT DOCUMENTS

| CN | 108154219 A | * | 6/2018 | | |
|---|---|---|---|---|---|
| CN | 108273761 A | * | 7/2018 | | |
| CN | 208033071 U | * | 11/2018 | ............... | B07C 5/02 |
| CN | 208033071 U | | 11/2018 | | |
| JP | 5201411 B2 | * | 6/2013 | | |
| JP | 5201411 B2 | | 6/2013 | | |

\* cited by examiner

LOGISTICS SORTING SYSTEM AND LOGISTICS SORTING METHOD

CROSS-REFERENCE TO RELATED APPLICATIONS

The present application claims priority to Chinese Patent entitled "Sorting methods, equipment and computer-readable storage media" of which application No. is CN201810941735.2 filed to the Chinese Patent Office on Aug. 17, 2018; and priority to Chinese Patent entitled "Logistics Sorting System and Logistics Sorting Method" of which application No. is CN201811327310.9 filed to the Chinese Patent Office on Nov. 8, 2018; and priority to Chinese Patent entitled "Cargoes sorting methods, devices and computer readable storage media" of which application No. is CN201811326328.7 filed to the Chinese Patent Office on Nov. 8, 2018, the contents of which are incorporated herein by reference in their entirety.

FIELD OF THE INVENTION

The invention pertains to the field of logistics and sortation, and in particularly relates to a logistics sorting system and a logistics sorting method.

BACKGROUND OF THE INVENTION

At present, the logistics industry has reached a blowout development stage. Each logistics company has to deal with a large number of packages every day and the competition among different logistics companies is also intense day by day. Therefore, timeliness and accuracy are the goals pursued by express companies and customers. Among them, the speed of logistics sortation is the most important factor constraining a major logistics companies to improve timeliness.

Domestic mainstream logistics industry has built a plurality of sorting lines of different scale in the regional sorting centers, mostly in the form of semi-automatic sorting system, that is, sorting equipments add manual. The sorting equipments are the sorting machines with inclined guide wheels, the sliding block sorting machines, the cross belt sorting machines, the flipping plate sorting machines, the AGV robots and so on. Generally speaking, the coverage rate of intelligent equipment is low and the automation level is not high. Most sorting centers still rely on manual sorting, which result in low efficiency of sorting, high rate of error and high labor cost.

SUMMARY OF THE INVENTION

The purpose of the invention is to provide a logistics sorting system and a logistics sorting method, aiming at solving the problem of low efficiency of sorting in existing logistics sorting system.

One aspect of the present disclosure is related to a logistics sorting system, wherein the logistics sorting system comprises: A transport module, configured to transport a cargo to be sorted and recycle a problem cargo; An identification module, configured to read the information of the cargo to be sorted and identify the attributes of the cargo; A sorting module, configured to provide a temporary buffer space for the cargo to be sorted, perform identification and sorting for the cargo to be sorted and process the problem cargo; A plurality of storage modules, configured to perform classifying storage for the cargo to be sorted and transfer the cargo; A central controller, configured to control each module of the logistics sorting system so that each module can cooperate with each other as a whole; The transport module arranged in the front of the sorting module, the identification module arranged on the top of the transport module or on the top of the sorting module, the plurality of storage modules arranged on both sides of the sorting module accordingly one by one, the central controller connecting electrically with the transport module, the identification module, the sorting module, and the plurality of the storage modules respectively.

In accordance with one embodiment of the present disclosure, wherein the transport module includes: a top conveyor, being configured to transport the cargo to the sorting module; a bottom conveyor, being configured to recycle and transport the problem cargo.

In accordance with one embodiment of the present disclosure, wherein the identification module comprises: a scanner for scanning the bar code of the cargo to be sorted to get the information of the cargo to be sorted; a vision sensor for obtaining the image information of the cargo to be sorted to determine a shape and a size attributes of the goods to be sorted.

In accordance with one embodiment of the present disclosure, wherein the sorting module includes: a sorting platform and a sorting robot, the sorting platform configured to provide a temporary buffer space for the cargo to be sorted, assist the sorting robot to identify and sort the cargo to be sorted and process the problem cargo, the sorting robot configured to perform identification and sorting for the cargo to be sorted with the assistance of the sorting platform, so as to sort the cargo to the corresponding storage module.

In accordance with one embodiment of the present disclosure, wherein the sorting platform includes a platform frame, a flipping platform, and a flipping power mechanism for driving the flipping platform to rotate, and the flipping platform and the flipping power mechanism respectively disposed on the platform frame.

In accordance with one embodiment of the present disclosure, wherein the sorting platform further includes a vision assistant board arranged on the upper surface of the flipping platform, and the upper surface of the vision assistant board provided with a background layer and a coordinate mark arranged uniformly on the background layer, and the coordinate mark arranged in a different color from the background layer.

In accordance with one embodiment of the present disclosure, wherein the sorting robot includes an end effector and a power mechanism that drives the end effector to perform three-dimensional motion in space, the end effector including an effector main body, the top of the effector main body provided with a power mechanism connector, so as the power mechanism to drive the main body, the bottom of the effector main body equipped with a parallel gripper module, and a detachable connection structure connected to any side of the main body for flexibly connecting a vacuum suction cup module or a sponge suction cup module to the main body.

In accordance with one embodiment of the present disclosure, wherein the plurality of storage modules include: an inner cart for storing and transferring the cargo of low processing frequency among the cargo to be sorted, and an outer cart for storing and transferring the cargo of high processing frequency among the cargo to be sorted, the inner cart arranged closer to the side where the sorting module is located than the outer cart arranged, the pull rod of the inner cart being longer than that of the outer cart such that the outer cart is sandwiched between the two pull rods of the inner cart.

In accordance with one embodiment of the present disclosure, wherein the logistics sorting system further includes a space protection shelf for providing a safe working area for each module of the logistics sorting system and providing installation locations for both the identification module and a plurality of indicators of each system.

Another aspect of the present disclosure is related to a logistics sorting method, based on the logistics sorting system, wherein the logistics sorting method comprises the following steps: transporting the cargo to be sorted to the sorting module by the transport module; performing identification and sorting for the cargo to be sorted and processing the problem cargo by the sorting module with the help of the identification module; performing classifying storage and transferring for the cargo to be sorted by a corresponding storage module, after the sorting module sorts the cargo to be sorted successfully; recycling the problem cargo by the transport module so as to perform sorting again later, after the sorting module fails to sort the cargo to be sorted.

In accordance with one embodiment of the present disclosure, the sorting module includes a sorting platform for providing a temporary buffer space for the cargo to be sorted, wherein the logistics sorting method further comprises: detecting the sorting platform, and controlling the transport module to stop running when detecting the presence of the cargo on the sorting platform; otherwise, controlling the transport module to operate to deliver the cargo to the sorting platform.

In accordance with one embodiment of the present disclosure, the transport module includes a cargo placing area arranged in the front of a cargo delivery area, wherein the logistics sorting method further comprises: detecting the cargo placing area, and stopping placing cargo to the cargo placing area when detecting the presence of the cargo on the cargo placing area.

In accordance with one embodiment of the present disclosure, wherein after the detecting the sorting platform, and the controlling the transport module to stop running when detecting the presence of the cargo on the sorting platform, the logistics sorting method further comprises: calculating the volume of cargo and scanning the identification code on the surface of the cargo; obtaining the destination of the cargo based on the identification code of the cargo; obtaining a corresponding end effector grasping plan according to the volume information of the cargo.

In accordance with one embodiment of the present disclosure, the plurality of storage modules include a plurality of storage areas, wherein the logistics sorting method further comprises: obtaining the quantity of the cargoes of each storage area; and controlling the corresponding storage area to emit an acoustic, optical or electrical signal when the quantity of cargo of the corresponding storage area lies above a certain threshold value.

In accordance with one embodiment of the present disclosure, wherein before the detecting the cargo placing area, and the stopping placing cargo to the cargo placing area when detecting the presence of the cargo on the cargo placing area, the logistics sorting method further comprises: moving the cargo to be sorted to a first preset position; detecting whether the cargo to be sorted is a single package; moving the cargo to be sorted to the cargo placing area when the cargo to be sorted is a single package.

In accordance with one embodiment of the present disclosure, wherein the moving the cargo to be sorted to a first preset position further includes: controlling a first manipulator to obtain the cargo to be sorted and to place the cargo to be sorted on the transport module; controlling the transport module to move the cargo to be sorted to the first preset position; the moving the cargo to be sorted to the cargo to be sorted placing area, when the cargo to be sorted is a single package further comprising, controlling the transport module to keep moving until the cargo to be sorted is located at the cargo placing area.

In accordance with one embodiment of the present disclosure, wherein the detecting whether the cargo to be sorted is a single package further includes: controlling a detector to capture the original picture of the cargo to be sorted; determining whether the cargo to be sorted is a single package based on the original picture and a pre-trained neural network.

In accordance with one embodiment of the present disclosure, wherein before the moving the cargo to be sorted to the cargo placing area, the logistics sorting method further comprises: moving the cargo to be sorted to a second preset position and obtaining an identification code of the cargo to be sorted when the cargo to be sorted is a single package.

In accordance with one embodiment of the present disclosure, wherein controlling a information reader to read the identification code of the cargo to be sorted when the cargo to be sorted pass the second preset position.

In accordance with one embodiment of the present disclosure, wherein moving the cargo to be sorted to an abnormal processing container when the cargo to be sorted is not a single package.

The beneficial effect of the embodiments is that it discloses a logistics sorting system and a logistics sorting method. The logistics sorting system comprises: the transport module arranged in the front of the sorting module, the identification module arranged on the top of the transport module or the top of the sorting module, the plurality of storage modules arranged on both sides of the sorting module accordingly one by one, the central controller connecting electrically with the transport module, the identification module, the sorting module, and the plurality of the storage modules respectively. In this way, each module of the logistics sorting system is controlled by the central controller so that each module may cooperate with each other as a whole, which resulting in the cargo to be sorted to be sorted to the corresponding storage module for storage and transfer with the full help of each module and effectively improving the automation of the logistics sorting system to solve the problem of low efficiency of sorting in existing logistics sorting system. At the same time, the complexity of the logistics sorting system might be further simplified, the sorting efficiency might be improved, and the operational integrity of the system may be guaranteed, by arranging the modules of the logistics sorting system appropriately.

BRIEF DESCRIPTION OF THE DRAWINGS

The invention will be described with reference to the accompanying drawings. These and/or other aspects and advantages of the invention will become apparent and more readily appreciated from the following description of the embodiments, taken in conjunction with the accompanying drawings. Obviously, the drawings in the following description are only some embodiments of the embodiments of the invention, and it will be apparent to those skilled in the art that other drawings may be obtained in accordance with the structures illustrated in the drawings without departing from the scope of the invention.

DETAILED DESCRIPTION OF THE INVENTION

The following is a clear and complete description of the technical solution in the invention in conjunction with the attached figure in the implementation of the invention. Obviously, the embodiments described are only a partial implementation of the present invention to help understand the present invention, and not the entire implementation. In addition, the technical features involved in the various embodiments of the present invention described below may be combined with each other as long as there is no conflict between them.

Embodiment 1

Figure 1:
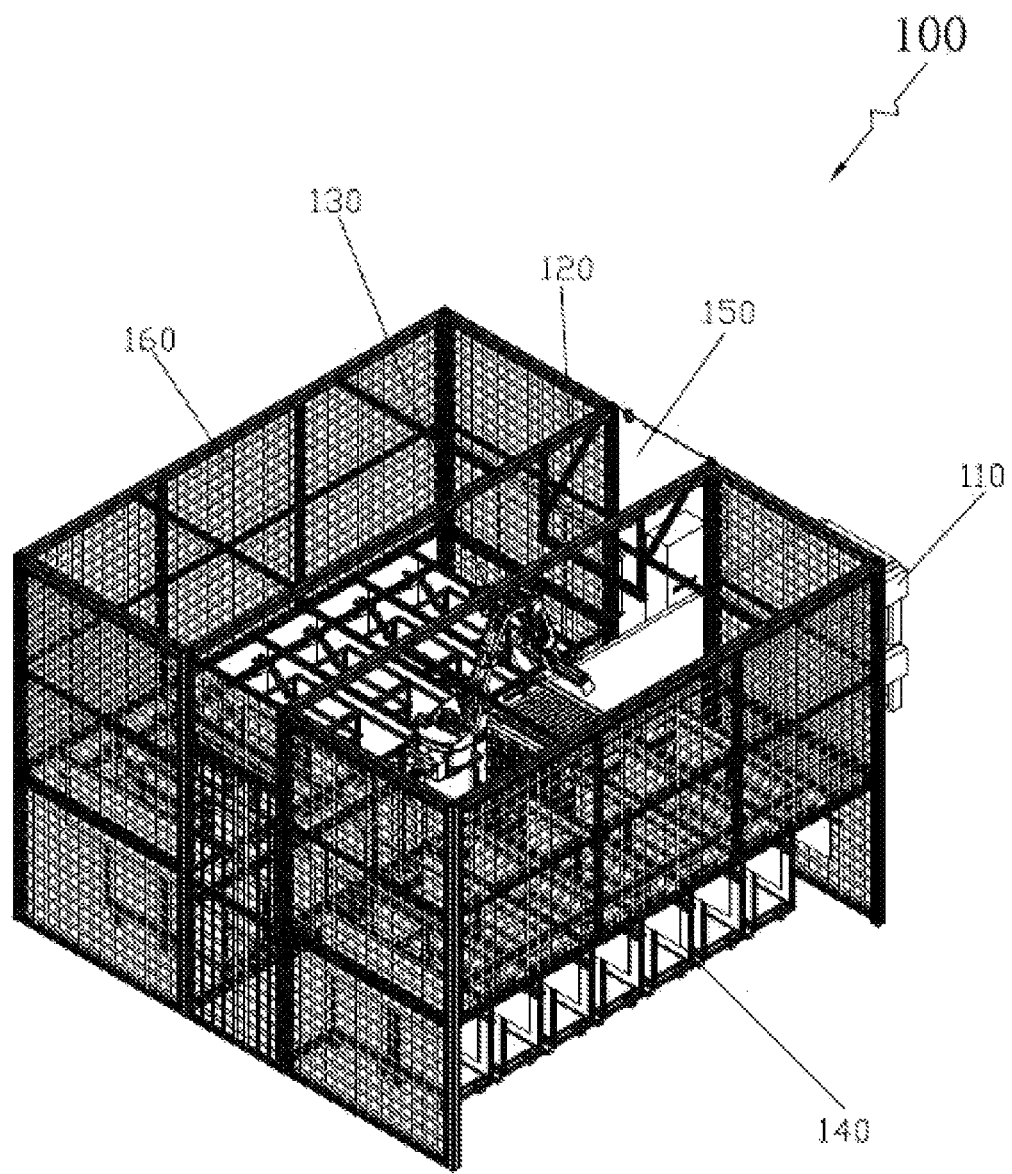
FIG. 1 is a structure diagram of the logistics sorting system.

Referring to FIG. 1, the embodiment of the invention is to provide a logistics sorting system 100, the logistics sorting system 100 comprising a transport module 110, an identification module 120, a sorting module 130, a plurality of storage modules 140, a central controller 150 and a space protection shelf 160.

Specifically, the transport module 110 is configured to transport a cargo to be sorted and recycle a problem cargo. Specifically, referring to FIG. 1 and FIG. 2, the transport module 110 includes a top conveyor 111 and a bottom conveyor 112, and the top conveyor 111 is configured to transport the cargo to the sorting module 130, while the bottom conveyor 112 is configured to recycle and transport the problem cargo, that is, the direction of transportation of the top conveyor 111 is opposite to that of the bottom conveyor 112. When working, the cargo to be sorted may be placed on the top conveyor 111 manually or a robot is arranged at the place where the goods are initially stacked, and the robot directly grabs the goods to be sorted and places them on the top conveyor 111. After the top conveyor 111 delivers the cargo to the sorting module 130, the sorting module 130 can detect the presence of the cargo and control the top conveyor 111 to stop moving so as the sorting module 130 to perform sorting operation of the logistics. The goods to be sorted which are not sorted successfully by the sorting module 130 will slide down to the bottom conveyor 112 again, and after the bottom conveyor 112 delivers the problem goods back to the original area or other designated location, controlling the transport module 110 to stop working, and the problem goods will be check, be modified, be handled separately or be placed back on the top conveyor 111 by workers for the goods being sorting again. In the embodiment, the top conveyor 111 and the bottom conveyor 112 both drive belts to move by motors to transport the goods to be sorted. For those skilled in the art, transport of the goods to be sorted by other means of transmission may be used according to actual scenario. In addition, a cargo placing area is arranged on one side of the top conveyor 111 far away from the sorting module 130 and the cargo placing area is equipped with a detection sensor (not shown) for detecting whether there is a cargo to be sorted at the cargo placing area; when the detection sensor detects the presence of cargo to be sorted, feedback information will be sent to a robot for sorting the cargo to be sorted, or be sent to workers, and the placement of the cargo to be sorted will be stopped to avoid a plurality of cargoes to be sorted stacking at the cargo placing area. More specific, when the robot is applied to place the cargo to be sorted, the detection sensor may be directly connected to the robot to feed beck the detection information to the robot. When the cargo to be sorted is placed by workers, a signal light can electrically connected with the detection sensor so that the detection information is converted into a signal light indication, which is convenient for manual observation and judgment. In addition, the detection information of the detection sensor may also be used as a signal of determining whether to control the top conveyor 111 to move or to stop; when the detection sensor detects the presence of cargo to be sorted at the cargo placing area, triggering the top conveyor 111 to perform moving, so as to improve the automation of the transport module 110.

An identification module 120 is configured to read the information of the cargo to be sorted and identify the attributes of cargo. More specific, the identification module 120 comprises a scanner, a vision sensor and a gravity sensor. The scanner is configured to scan the bar code of the cargo to be sorted to get the information of the cargo to be sorted. The scanner may be arranged on the top of the transport module 110 to scan the bar code of the cargo to be sorted while the cargo to be sorted is being transported. Or the scanner may be arranged on the top of the sorting module 130 to scan the bar code of the cargo to be sorted while the cargo to be sorted is being sorted. The gravity sensor is configured to obtain the weight information of the cargo to be sorted so as to determine the weight attribute of the cargo to be sorted. The vision sensor is configured to obtain the image information of the cargo to be sorted to determine a shape and a size attributes of the goods to be sorted.

Figure 2:
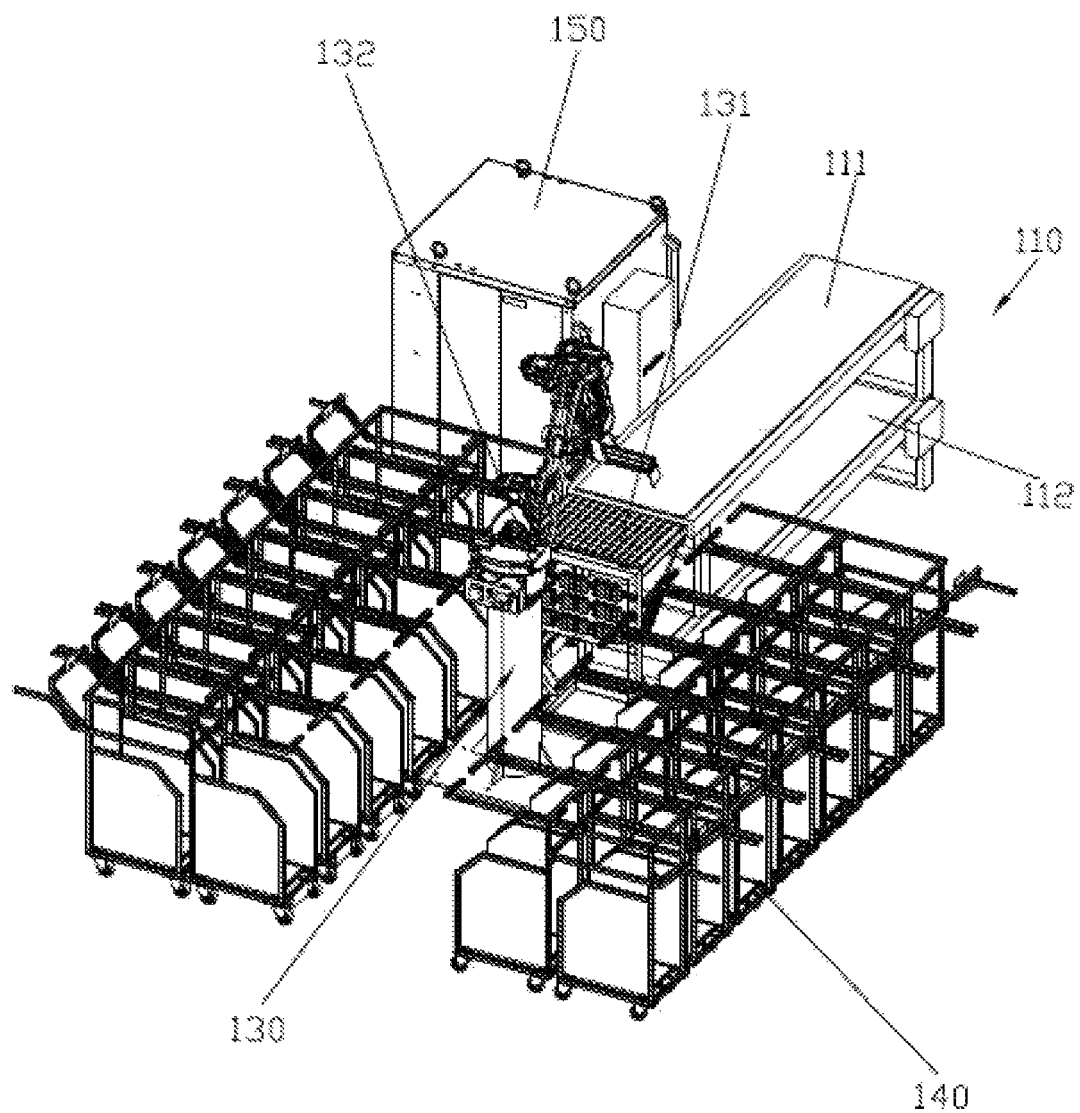
FIG. 2 is a structure diagram of the logistics sorting system without the space protection shelf.
Figure 3:
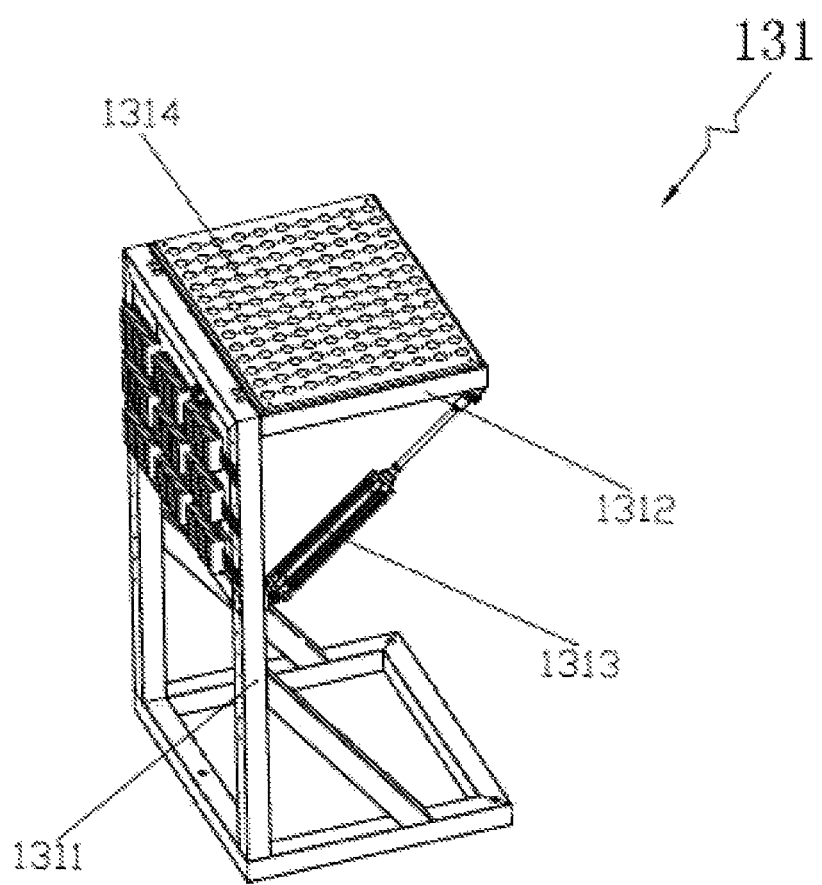
FIG. 3 is a structure diagram of the sorting platform of the logistics sorting system.

The sorting module 130 is configured to provide a temporary buffer space for the cargo to be sorted, perform identification and sorting for the cargo to be sorted and process the problem cargo. Specifically, referring to FIG. 2, the sorting module 130 includes a sorting platform 131 and a sorting robot 132. The sorting platform 131 is configured to provide a temporary buffer space for the cargo to be sorted, configured to assist the sorting robot 132 to identify and sort the cargo to be sorted and configured to process the problem cargo. Referring to FIG. 3, the sorting platform 131 includes a platform frame 1311, a flipping platform 1312, and a flipping power mechanism 1313 for driving the flipping platform 1312 to rotate; and the flipping platform 1312 and the flipping power mechanism 1313 are respectively disposed on the platform frame 1311. The gravity sensor of the identification module 120 may be arranged on the flipping platform 1312 to facilitate detecting the weight of the goods to be sorted. The flipping power mechanism 1313 can drive the flipping platform 1312 to rotate by means of piston. Specifically, driving the flipping platform 1312 to rotate 45 degrees, that is, the angle of flipping platform 1312 changes from a horizontal angle which is coupled to the top conveyor 111 to an incline angle which is coupled to the bottom conveyor 112, and other methods could also be used to rotate the flipping platform 1312. In addition, the sorting platform 131 further includes a vision assistant board 1314 arranged on the upper surface of the flipping platform 1312, and the upper surface of the vision assistant board 1314 is provided with a background layer and a coordinate mark arranged uniformly on the background layer. The coordinate mark is in a different color from the background layer. When performing sorting the goods, the goods to be sorted firstly falling down to the sorting platform 131 to cover part of the vision assistant board 1314, and at the same time, the vision sensor of the identification module 120 on the top of the sorting module 130 can capture 3D images, and then extracting the point-clouds of the goods to be sorted from the 3D images, to obtain the shape information of the goods to be sorted by calculation. On one hand, the captured 3D images include both the image data of the cargo to be sorted on the vision assistant board 1314 and the image data of the background layer and the coordinate marks, and at the same time the background layer and the coordinate marks of the vision assistant board 1314 forming the background of goods to be sorted in the 3D images. The vision sensor can segment the captured 3D images to obtain information of the goods to be sorted based on such background, which could improve the accuracy of image segmentation, so as to greatly improve the accuracy of locating the position of the goods to be sorted. On other hand, when the vision sensor fails to perform calculation to obtain the shape information of goods to be sorted by means of segmentation, detecting the 3D images to obtain covering information of a part of the coordinate marks of the vision assistant board 1314, the part of the coordinate marks of the vision assistant board 1314 covered by the goods to be sorted. Locating the position of the goods to be sorted could be successful by means of calculating the covering information, which allows the locating the position of the goods to be sorted to be double guaranteed. Further, the coordinate marks are in the form of dots. The dot referred to in this embodiment is a solid circle. The dot-shaped coordinate mark has a relatively regular shape and is a continuous line of dot, thereby facilitating calculation by the covering information. The coordinate mark has a diameter of 25±2 mm. With a dot of about 25 mm, it is possible to strike a balance between the accuracy of calculation and efficiency of calculation, to achieve fast and accurate results. An interval between every two coordinate marks is 20±2 mm. Preferably, the interval between the every two coordinate marks is 20 mm, that is, the interval between the edges of the every two dots is 20 mm. With an interval of about 20 mm, it is possible to strike a balance between the accuracy of calculation and efficiency of calculation, to achieve fast and accurate results. The coordinate marks are arranged in an array along the length direction and the width direction of the upper surface. Further, in other embodiments, other arrangements may be applied. For example, the number of rows and columns of the coordinate marks is 12×9, that is, 12 rows of the coordinate marks are provided along the length direction of the upper surface, and 9 columns of the coordinate marks are provided in the width direction of the upper surface, the total number of which is 108. With the rows and the columns of coordinate marks being 12×9, it is possible to resolve the problem that concerns the inherent trade-off between calculation accuracy and calculation efficiency, achieving a fast and accurate result. The colour of the background layer is white, and the colour of the coordinate mark is black, which on one hand, solves the problem that the coordinate mark is too difficult to be recognized, and on other hand, solves the problem that the envelope is so white that make it difficult to position the envelope for the vision structure. The vision assistant board 1314 is preferred to equip with a plurality of optical fibers for emitting the light source and the light source for being received by the vision sensor, resulting in the vision sensor quickly determining whether there is a cargo on the vision assistant board 1314. When part or all of the light source of the vision assistant board 1314 is blocked by an object, the vision sensor cannot receive the complete light source, and then determining that there is a cargo to be sorted on the vision assistant board 1314, for performing identification or sorting later. Further, the plurality of optical fibers are arranged in an array to cover the whole background layer densely, so that any ordinary package or envelope falling on the vision assistant board 1314 can block at least part of the light source. Further, the plurality of optical fibers are arranged in conjunction with coordinate marks of the vision assistant board 1314, and every optical fiber is disposed at a interval between the every two coordinate marks. In addition, the plurality of optical fibers are also configured to be a fill light when the vision sensor is capturing the 3D image. The top conveyor 111 transports the goods to be sorted to the sorting platform 131, and the goods to be sorted are identified on the sorting platform 131 by the scanner, when the sensor determining it satisfies a preset condition, that is, when failing to sort the goods to be sorted on the sorting platform 131, controlling the piston to turn the vision assistant board 1314 down so as the goods to be sorted sliding down to the bottom conveyor 112. Then the bottom conveyor 112 starts to move and to deliver the goods to be sorted back to the original area or other designated location.

Figure 4:
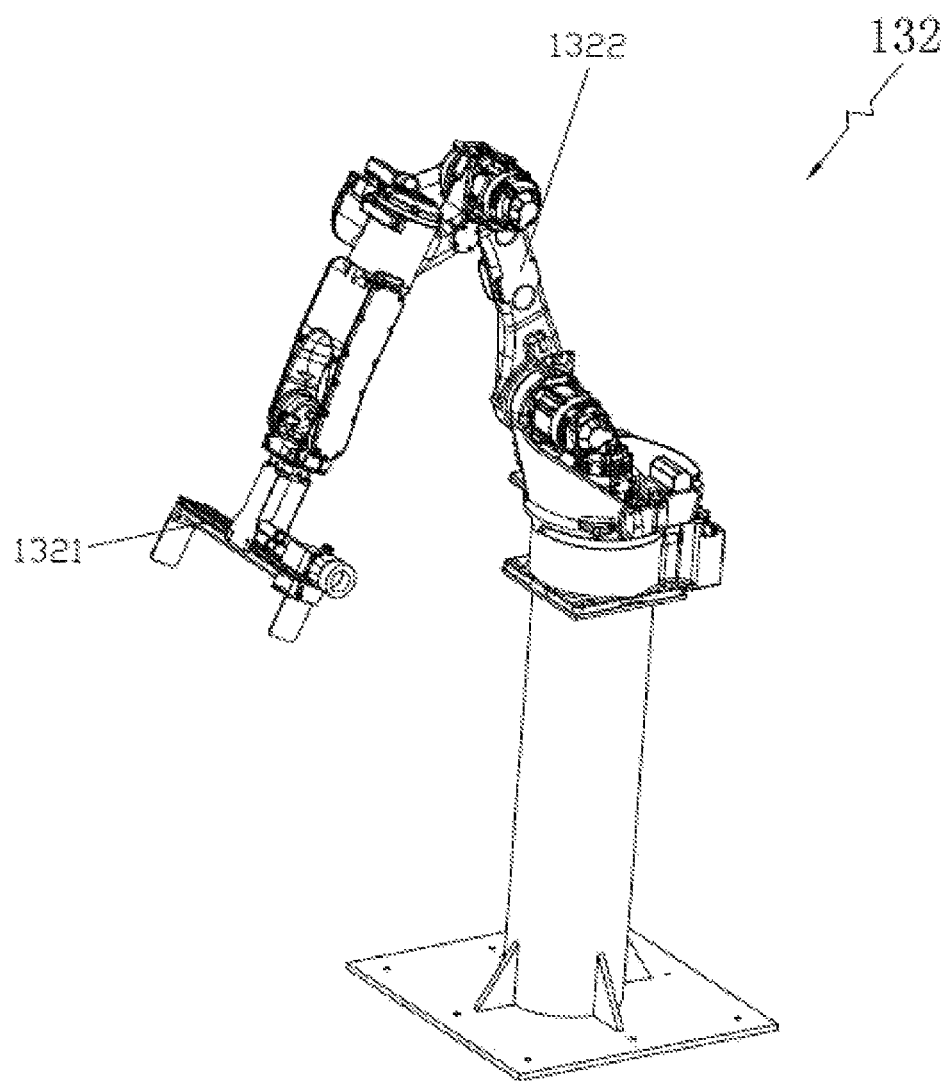
FIG. 4 is a structure diagram of the sorting robot of the logistics sorting system.

Referring to FIG. 4, the sorting robot 132 is configured to perform identification and sorting for the cargo to be sorted with the assistance of the sorting platform 131, so as to sort the cargo to the corresponding storage module. The sorting robot 132 includes an end effector 1321 and a power mechanism 1322 that drives the end effector 1321 to perform three-dimensional motion in space. The end effector 1321 includes an effector main body, and the top of the effector main body provided with a power mechanism connector, so as the power mechanism 1322 to drive the main body. The bottom of the effector main body is equipped with a parallel gripper module to deal with logistics sorting work of hard and large size cartons and part of soft packages, and a detachable connection structure connected to any side of the main body for flexibly connecting a vacuum suction cup module or a sponge suction cup module to the main body, which users can freely adopt an arrangement based on their own scenarios. For example, on one hand, the main body equipped with the vacuum suction cup module can perform logistics sorting work of hard and small size cartons and logistics sorting work of all kinds of envelops, and on other hand, the main body equipped with the sponge suction cup module can perform logistics sorting work of all soft packages. The end effector 1321 of the embodiment integrates all kinds of processing modules which are mature in the industry, and completely solves the problem that a plurality of types of goods and the grippers are poorly matched in the current logistics sorting system. Through the electronic circuits controlling the robot, the robot's grasping strategy and planning strategy work together to successfully perform sorting of almost all types of logistics parcels.

Figure 5:
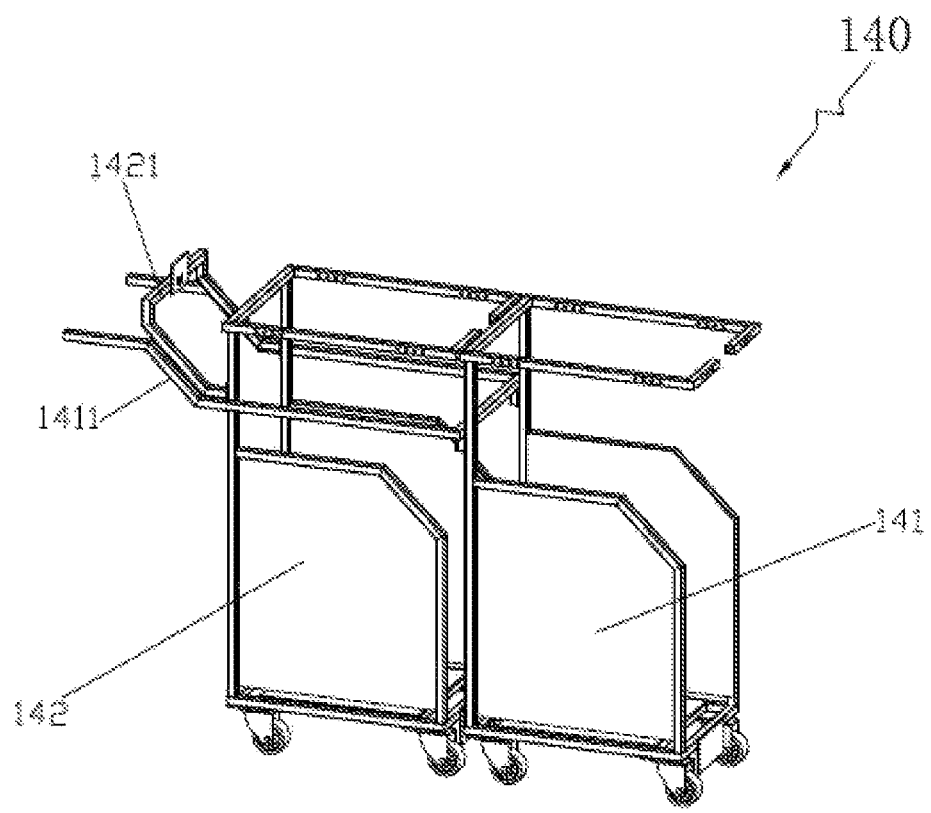
FIG. 5 is a structure diagram of the storage modules of the logistics sorting system.

The plurality of storage modules 140 are configured to perform classifying storage for the cargo to be sorted and transfer the cargo. More specific, referring to FIG. 5, the plurality of storage modules 140 include an inner cart 141 for storing and transferring the cargo of low processing frequency among the cargo to be sorted, and an outer cart 142 for storing and transferring the cargo of high processing frequency among the cargo to be sorted. The inner cart 141 is arranged closer to the side where the sorting module 130 is located than the outer cart 142 arranged, and a pull rod of the inner cart 141 being longer than that of the outer cart 142 such that the outer cart 142 is sandwiched between the two pull rods of the inner cart 141. Referring to FIG. 4 and FIG. 5, every storage module includes two parts, and on one hand, when the inner cart 141 is full of cargoes, pulling the pull rods of the inner cart 141 to pull out the whole storage module to replace the bag of the inner cart 141, and on other hand, when the outer cart 142 is full of cargoes, directly pulling the pull rods of the outer cart 142 to replace the bag of the outer cart 142. The inner cart 141 is configured to store the cargo of low processing frequency when performing sorting, because replacement of the bag of inner cart 141 is more inconvenient, and the outer cart 142 is configured to store the cargo of high processing frequency, such as cargoes in the same city or adjacent area. Referring to FIG. 2, the logistic sorting system includes fourteen storage modules 140 with twenty-eight categories, which greatly improves the speed of the robot motion planning and efficiency of sorting within the robot working area. When a cart is full of cargoes, pulling out the corresponding cart and replacing the storage bags, and then transferring the bags filled with cargoes to other places. During this period, the robot does not stop working, and if the goods to be sorted by the robot are just happened to be sorted to the cart being replaced, the goods to be sorted are put back to the sorting platform 131 or placed in a special box, for being sorted later.

The central controller 150 is configured to control each module of the logistics sorting system 100 so that each module can cooperate with each other as a whole. Specifically, the transport module 110 is arranged in the front of the sorting module 130, the identification module 120 is arranged on the top of the transport module 110 or the top of the sorting module 130, the plurality of storage modules 140 are arranged on both sides of the sorting module 130 accordingly one by one, and the central controller 150 connects electrically with the transport module 110, the identification module 120, the sorting module 130, and the plurality of the storage modules 140 respectively.

Referring to FIG. 1, the space protection shelf 160 is for providing a safe working area for each module of the logistics sorting system 100 and providing installation locations for the identification module 120 and for a plurality of indicators of each system. Specifically, referring to FIG. 1, the space protection shelf 160 provides a closed working space for the sorting module 130, and the sorting robot 132 of the sorting module 130 is located at the center of the closed working space. Each position in the closed working space is configured to be reachable by the robot arm. A first opening is arranged right in front of the sorting robot 132 for arranging the sorting platform 131 and the transport module 110. A crosswalk and a closing door are arranged at the back of the sorting robot 132 for the staff to enter the working area to debug and maintenance. A second opening is arranged below the opposite sides of the space protection shelf 160 for arranging the plurality of storage modules 140, and a baffle is provided below the opposite sides of the space protection shelf 160 for fixing the cart position. A second vision sensor and a big indicator light are arranged above the opposite sides of the space protection shelf 160, the second vision sensor for detecting the presence of the cargoes and whether the cargoes are full of carts. A small indicator light is arranged at the corresponding position of the side direction of the cart. In addition, the bottom of the space protection shelf 160 is equipped with a positioning device and a positioning detection device, and the positioning detection device for determining if the cart of the storage module is in place, and if it was not in place, the staff could be reminded by lights or sounds. When the second vision sensor detects the cargoes are loaded in the corresponding cart to a threshold (e.g., the cargoes loaded in the left first inner cart 141 to a threshold), information fed back to the central controller 150 so as the central controller 150 to control the big indicator light on left side to turn on and also to control red light of the small indicator light on shelf corresponding to the left first inner cart 141 to turn on (green light of the small indicator corresponding to the outer cart 142). The staffs come to the left side based on the indication of the big indicator light and then pull out a corresponding cart to replace a bag full with cargo with a new bag based on the indication of the small indicator light and push the cart back and finally transfer sorted storage bags to other locations.

In addition, in order to facilitate staff to view and control the operation process of each module from a whole, the logistics sorting system 100 further includes a display screen (not shown), which is arranged on the space protection shelf 160, and electrically connected with the central controller 150.

Embodiment 2

Figure 6:
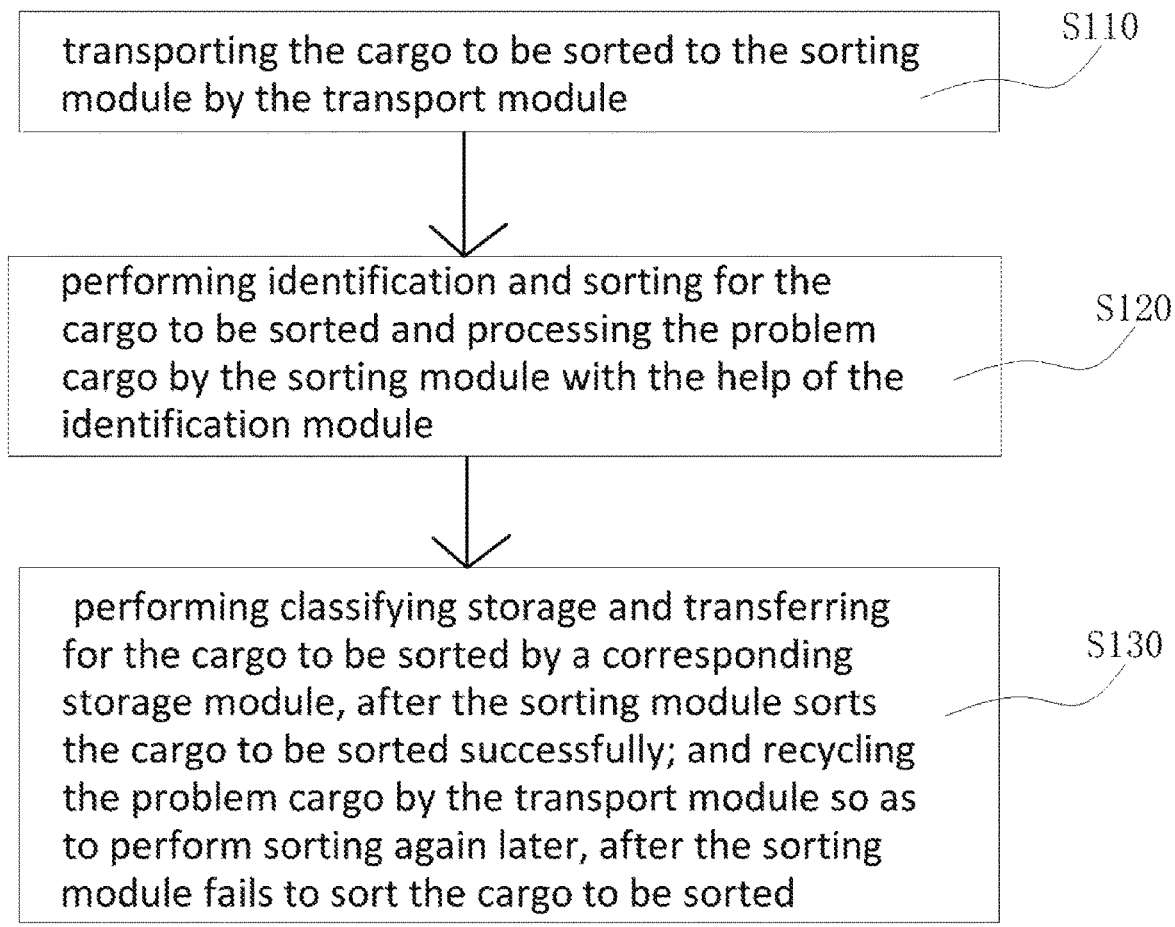
FIG. 6 is a flow diagram illustrating techniques according to the embodiment two.

Referring to FIG. 6, the second embodiment of the present invention provides a logistics sorting method, which is implemented based on the logistics sorting system of the first embodiment. The logistics sorting method includes the following steps:

S110: transporting the cargo to be sorted to the sorting module by the transport module;

S120: performing identification and sorting for the cargo to be sorted and processing the problem cargo by the sorting module with the help of the identification module;

S130: performing classifying storage and transferring for the cargo to be sorted by a corresponding storage module, after the sorting module sorts the cargo to be sorted successfully; and recycling the problem cargo by the transport module so as to perform sorting again later, after the sorting module fails to sort the cargo to be sorted.

More specific, referring to FIG. 1 and FIG. 2, the cargo to be sorted may be placed on the top conveyor 111 manually or a robot is arranged at the place where the goods were initially stacked to directly grab the goods to be sorted and to place them on the top conveyor 111. After the top conveyor 111 delivers the cargo to the sorting platform 131, the sorting platform 131 can detect the presence of the cargo and the logistics sorting system controls the top conveyor 111 to stop working, and then the logistics sorting system controls the top conveyor 111 to start working again until there are no cargoes on the sorting platform 131. The scanner may be arranged on the top of the top conveyor 111, that is, the scanner scans the bar code of the cargo to be sorted while the cargo to be sorted is being transported. Or the scanner may be arranged at the back of the sorting platform 131 to scan the bar code of the cargo to be sorted while the cargo to be sorted is being sorted. The identification and the determination of the cargo to be sorted on the sorting platform 131 are performed both by the vision assistant board 1314 including the gravity sensor and the optical fibers inside and by the vision sensor on the space protection shelf 160, so as to obtain the attributes of the cargo. Adopting the appropriate end effector 1321 (gripper or sponge suction cup) to pick up the cargoes, based on the attributes of the cargoes. Based on the information of cargoes identified by the scanner, controlling the arm of sorting robot 132 to move to the cart corresponding to the information and then controlling the arm of sorting robot 132 to release the cargo into the corresponding storage module 140. The arm of sorting robot 132 returns to its original position and repeats the steps mentioned above. When failing to scan the information of the cargoes, or determining that the weight or the volume of the cargoes exceeds a threshold, or the sorting robot 132 failing to grasp the cargoes, controlling the sorting platform 131 to turn downward for the cargoes to be sorted to slide down to the bottom conveyor 112 and then triggering the bottom conveyor 112 to move and deliver the cargoes to be sorted back to the original area or other designated location and at last after the bottom conveyor 112 stopping working, the problem cargoes will be check, be modified, be handled separately or be placed back onto the top conveyor 111 by workers, for the cargoes being sorting again.

The embodiment discloses the logistics sorting system and the logistics sorting method, which comprise the transport module arranged in the front of the sorting module, the identification module 120 arranged on the top of the transport module or the top of the sorting module, the plurality of storage modules arranged on both sides of the sorting module accordingly one by one, the central controller 150 connecting electrically with the transport module, the identification module 120, the sorting module, and the plurality of the storage modules respectively. In this way, each module of the logistics sorting system is controlled by the central controller 150 so that each module can cooperate with each other as a whole, which resulting in the cargo to be sorted being sorted to the corresponding storage module for storage and transfer with the full help of each module and effectively improving the automation of the logistics sorting system to solve the problem of low efficiency of sorting in existing logistics sorting system. At the same time, the complexity of the logistics sorting system may be further simplified, the sorting efficiency may be improved, and the operational integrity of the system may be guaranteed, by arranging the modules of the logistics sorting system appropriately.

Figure 7:
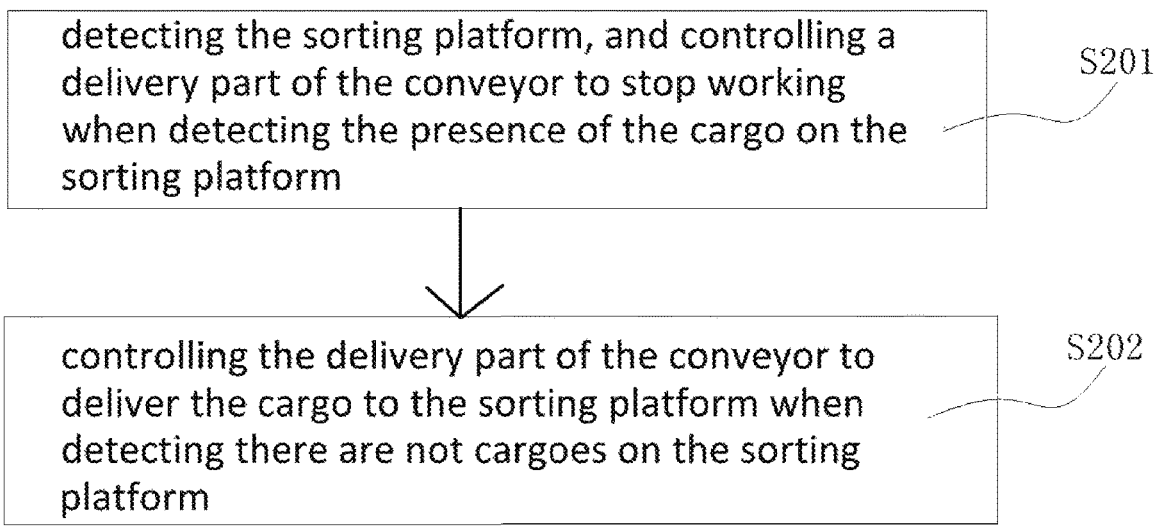
FIG. 7 is a flow diagram illustrating techniques according to one embodiment of the present invention.

Referring to FIG. 7, another embodiment of the present invention, in which steps are added on the basis of the second embodiment: detecting the sorting platform, and controlling the transport module to stop running when detecting the presence of the cargo on the sorting platform; otherwise, controlling the transport module to operate to deliver the cargo to the sorting platform.

In this embodiment, the transport module may be a conveyor or a conveyor belt and so on.

S201: detecting the sorting platform, and controlling a delivery part of the conveyor to stop working when detecting the presence of the cargo on the sorting platform;

S202: controlling the delivery part of the conveyor to deliver the cargo to the sorting platform when detecting there are not cargoes on the sorting platform.

Controlling the delivery part of the conveyor to move while detecting whether there is cargoes on the sorting platform, and controlling the delivery part of the conveyor to stop working when detecting the presence of the cargo on the sorting platform. Wherein, the system can detect whether there are cargoes on the sorting platform through a variety of sensors. For example, detecting whether the weight of sorting platform is change or not, detecting whether the light is blocked, or performing classification and identification by machine vision, etc. Controlling the delivery part of the conveyor to stop working when detecting the presence of the cargo on the sorting platform to avoid too many cargoes to be sorted on the sorting platform which will interrupt the identification steps of the cargo and grab steps of the cargo and so on. One preferred option is that only one cargo on the sorting platform once a time.

In this embodiment, during the process of placing the cargoes to the corresponding storage area, detecting the sorting platform again and when detecting there are not cargoes on the sorting platform, controlling the delivery part of the conveyor to deliver the cargo to the sorting platform. Wherein, the robot can take all the goods on the sorting platform at once, for example, the robot grabs one or more goods at a time, or the robot grabs the goods multiple times, one or more goods at a time and so on. After all the goods being grabbed, and without any cargo on the sorting platform, controlling the delivery part of the conveyor to move, so that the system can work cyclically to realize automatic sorting of goods.

Further, in other embodiment, the delivery part of the conveyor may also be arranged to move at a preset time interval. For example, by statistics, it is known that the safe time for the manipulator to complete the grabbing and placing of goods is 15 seconds, then the operation interval of the conveyor may be set to 15 seconds.

Figure 8:
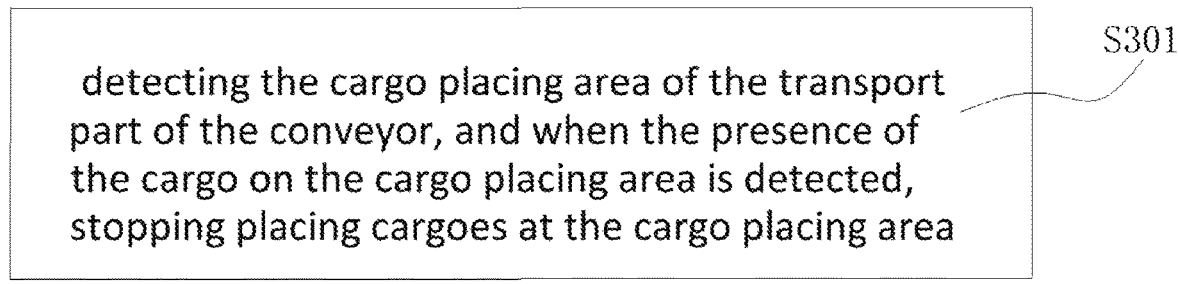
FIG. 8 is a flow diagram illustrating techniques according to one embodiment of the present invention, which includes one more step than the flow diagram shown in FIG. 7.

Referring to FIG. 8, further, in other embodiment, the transport module includes a cargo placing area arranged in the front of a cargo delivery area, and detecting the cargo placing area, and stopping placing cargo to the cargo placing area when detecting the presence of the cargo on the cargo placing area. More specific, the transport module is a conveyor, step 301: detecting the cargo placing area of the transport part of the conveyor, and when the presence of the cargo on the cargo placing area is detected, stopping placing cargoes at the cargo placing area.

In this embodiment, firstly detecting the cargo placing area of the transport part of the conveyor, and when the presence of the cargo on the cargo placing area is detected, stopping placing cargoes at the cargo placing area. Wherein, the front part of the conveyor is provided with the cargo placing area for placement of the cargo. The system can detect the presence of the cargo by a plurality of kinds of sensors. For example, the presence of cargo may be detected through a sensor configured to determine whether the weight of cargo is change or not, or through a sensor configured to detect whether light is block or not, or through the machine vision performing classification and identification. When the presence of cargo on the cargo placing area is detected, stopping placing cargoes at the cargo placing area. For example, after the placement of cargo, the conveyor does not move, resulting in the cargo not be transported away from the cargo placing area, and at this situation, it is necessary to suspend the placement of cargo on the cargo placing area, and placement of cargo on the cargo placing area is not allowed until the cargo is transported away from the cargo placing area.

The logistics sorting method provided by the embodiment detects the cargo placing area, and when the cargo placing area is idle, cargo are delivered to the transport part of the conveyor, so that an interval may be formed between every two cargo to avoid a plurality of cargoes moving to the sorting platform continuously.

Figure 9:
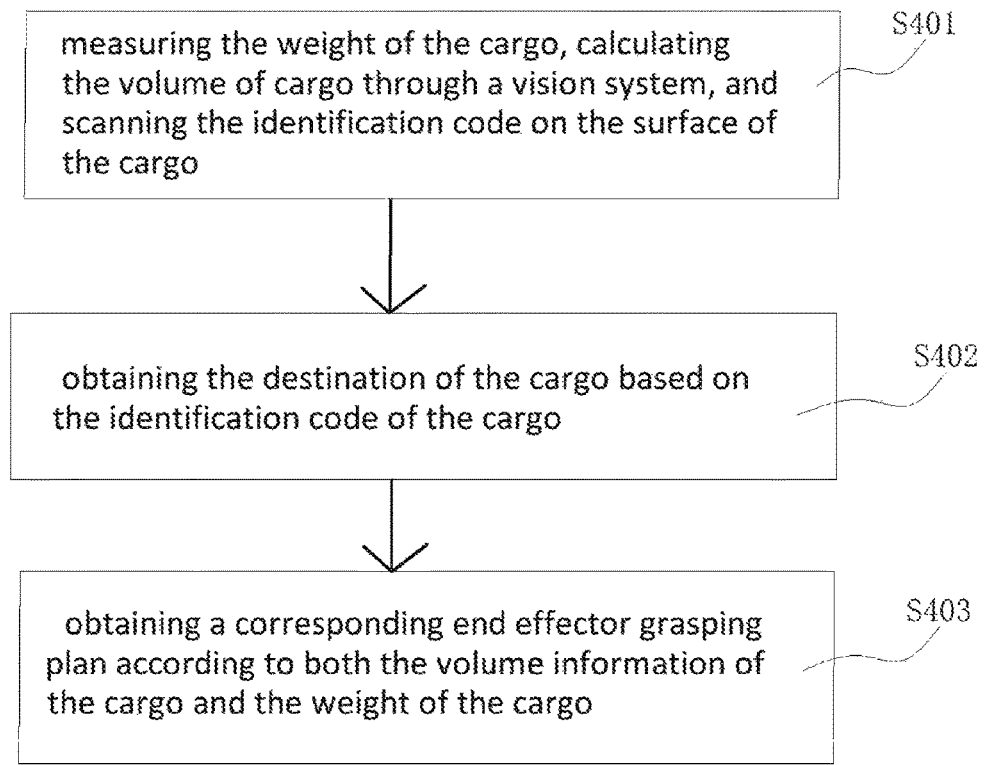
FIG. 9 is a flow diagram illustrating techniques according to anther embodiment of the present invention.

Referring to FIG. 9, further, in other embodiment, the sorting module performing identification and sorting for the cargo to be sorted includes: calculating the volume of cargo and scanning the identification code on the surface of the cargo; obtaining the destination of the cargo based on the identification code of the cargo; and obtaining a corresponding end effector grasping plan according to the volume information of the cargo. Specifically, including S401: measuring the weight of the cargo, calculating the volume of cargo through a vision system, and scanning the identification code on the surface of the cargo; S402: obtaining the destination of the cargo based on the identification code of the cargo; S403: obtaining a corresponding end effector grasping plan according to both the volume information of the cargo and the weight of the cargo. In this embodiment, after the presence of the goods on the sorting platform has been detected, measuring the weight of the goods, calculating the volume of cargo through the vision system, and scanning the identification code on the surface of the cargo.

In this embodiment, after detecting the presence of the cargo on the sorting platform, measuring the weight of the cargo, calculating the volume of cargo through a vision system, and scanning the identification code on the surface of the cargo. Wherein the weight of the cargo is measured by installing a weight measuring module on the sorting platform. The volume of cargo is calculated by the vision system, which may be a depth camera. The identification code on the surface of the cargo may be scanned by an infrared scanner.

In this embodiment, after identifying the identification code of the cargo, obtaining the destination of the cargo based on the identification code of the cargo. Wherein, the system can search through the identification code to the back-end database for obtaining the information filled out by the sender, such as recipient information, sender information, type of goods, volume of goods and weight of goods, etc.

In this embodiment, after identifying the volume and weight of cargo, obtaining a corresponding end effector grasping plan according to the volume and weight of cargo. Wherein, different grasping actions are required to pick up different cargoes, because the cargoes come in various attributes. For example, the arm of the robot may be configured to connect with all kinds of end effectors for grasping all kinds of cargoes. For example, picking up flat goods through a sponge suction cup, grabbing rectangular goods more than 20 kg through five-claw grippers, or grasping rectangular goods within 5 kg through three-claw grippers and so on.

Figure 10:
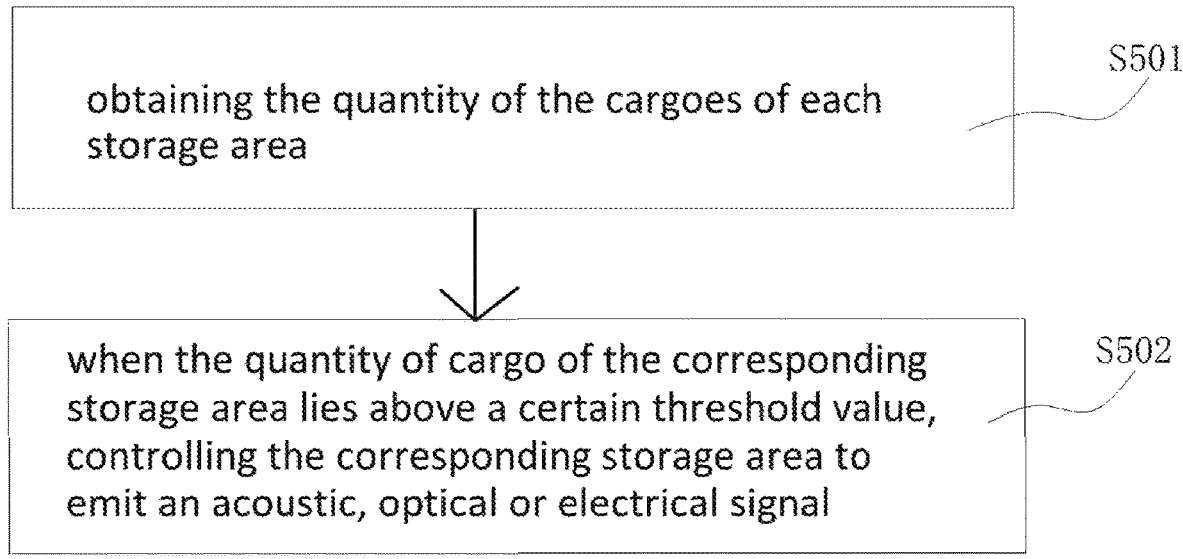
FIG. 10 is a flow diagram illustrating techniques according to anther embodiment of the present invention, which includes two more step than the flow diagram shown in FIG. 9.

Referring to FIG. 10, In addition, in other embodiment, the plurality of storage modules include a plurality of storage areas, and the logistics sorting method further includes, S501: obtaining the quantity of the cargoes of each storage area; and S502: when the quantity of cargo of the corresponding storage area lies above a certain threshold value, controlling the corresponding storage area to emit an acoustic, optical or electrical signal.

In this embodiment, real-time detecting each storage area to obtain the quantity of cargoes of each storage area. Wherein, there are many options for detection, such as detecting weight and detecting volume.

In this embodiment, after obtaining the quantity of the cargoes of each storage area, compare the quantity of the cargoes of each storage area with the certain threshold value. When the quantity of cargoes of the corresponding storage area lies above the certain threshold value, controlling the corresponding storage area to emit an acoustic, optical or electrical signal. The sound may be a live voice indication; the light may be a the report light flashing in a specific frequency; the electrical signal may be sent to the system and reported by the system's display interface, or may command subsequent robots to perform steps, etc.

In this embodiment, preferably, the obtaining the quantity of cargoes of each storage area comprises: measuring the quantity of cargoes of each storage area by using a vision sensor, that is, the quantity of cargoes in storage area may be detected by machine vision and identification of changes in images. For example, the height of cargoes in each storage area may be calculated by a neural network. When the height of cargoes in the storage area satisfies a preset height, indicating the corresponding storage area is full of cargoes.

Figure 11:
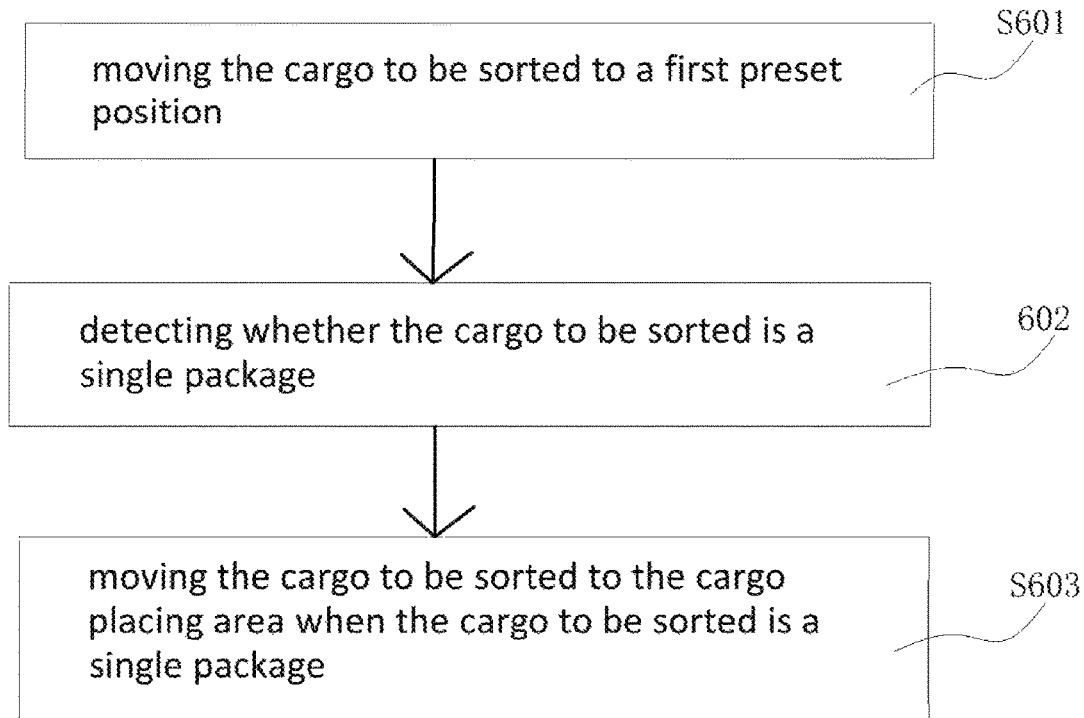
FIG. 11 is a flow diagram illustrating techniques according to anther embodiment of the present invention.

Referring to FIG. 11, in addition, in other embodiment, before cargoes are transported to the cargo placing area of the transport module, performing pre-sorting and singulation for cargoes. Specifically, S601: moving the cargo to be sorted to a first preset position; S602: detecting whether the cargo to be sorted is a single package; S603: moving the cargo to be sorted to the cargo placing area when the cargo to be sorted is a single package.

In particular, the moving the cargo to be sorted to a first preset position may be fulfilled by controlling a first manipulator to obtain the cargo to be sorted and to place the cargo to be sorted on the transport module; controlling the transport module to move the cargo to be sorted to the first preset position; and the moving the cargo to be sorted to the cargo placing area, when the cargo to be sorted is a single package further comprising, controlling the transport module to keep moving until the cargo to be sorted is located at the cargo placing area.

In particular, the detecting whether the cargo to be sorted is a single package may be fulfilled by controlling a detector to capture the original picture of the cargo to be sorted; and then determining whether the cargo to be sorted is a single package based on the original picture and a pre-trained neural network.

More specific, before the moving the cargo to be sorted to the cargo placing area, the logistics sorting method further comprises: moving the cargo to be sorted to a second preset position and obtaining an identification code of the cargo to be sorted when the cargo to be sorted is a single package. Controlling an information reader to read the identification code of the cargo to be sorted when the cargo to be sorted pass the second preset position. If the cargo to be sorted is not a single package, moving the cargo to be sorted to an abnormal processing container.

In this embodiment, the cargo placing area may be configured to a target area of the pre-sorting or a target area of the singulation. More specific, moving the cargoes to the first preset position at first, the equipment for moving cargoes can usually be suction cups or grippers of manipulators or conveyor belts, etc. The first preset position is a position that was chosen in advance, and after the cargoes are located at the first preset position, the logistics sorting method can move on to the next step.

In this embodiment, after moving the cargoes to the first preset position, detecting whether the cargo to be sorted is a single package. Wherein the cargo to be sorted is a single package, it is normal. When the gripper of the robot grasps at least two cargoes at one time, the system will determine that it is not a single package.

In this embodiment, after detecting the cargo to be sorted is a single package, moving the cargo to be sorted to a second preset position. The second preset position is a position that was chosen in advance, and after the cargoes are located at the second preset position, the logistics sorting method may move on to the next step.

In this embodiment, after moving the cargo to be sorted to the second preset position, obtaining the identification code of the cargo to be sorted, and then moving the cargo to be sorted to a target area. Wherein, the identification code of the cargo to be sorted may be identified by a scan code gun or a near field communication equipment. The target area is a position that was chosen in advance, and after the cargoes are located at the target area, the logistics sorting method may move on to the next step.

The logistics sorting method provided in this embodiment, after acquiring the goods, moves the cargo to be sorted to the first preset position, and then detects whether it is a single package; if so, performing subsequent recognition and moving the cargo to be sorted to the target position, which is possible to avoid the situation that the plurality of cargoes are delivered to the sorting platform to occur the abnormality of the subsequent process steps.

In particular, if the cargo to be sorted is not a single package, moving the cargo to be sorted to an abnormal processing container. More specific, it may be to suspend the conveyor belt and to perform alarm for the manual to take away the cargo to be sorted; or a pusher being set on the transport path to push the cargo to be sorted away from the transport path into the abnormal processing container and so on.

In this embodiment, detecting whether the cargo to be sorted is a single package could be fulfilled by controlling a detector to capture the original images of the cargo to be sorted, and the determining whether the cargo to be sorted is a single package based on the original images of the cargo to be sorted and the pre-trained neural network. Wherein, putting the original image into the pre-trained neural network for classification, and obtaining a pixel set of all objects in the original image based on the classification. If another object is included to overlap the cargo to be sorted, it is determined that it is not a single package; otherwise, it is determined it is a single object.

The embodiments of the present invention are described in detail above in conjunction with the drawings, but the present invention is not limited to the described embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A logistics sorting system, comprising:
   a transport module, configured to transport a cargo to be sorted and recycle a problem cargo;
   an identification module, configured to read the information of the cargo to be sorted and identify the attributes of the cargo;
   a sorting module, configured to provide a temporary buffer space for the cargo to be sorted, perform identification and sorting for the cargo to be sorted and process the problem cargo;
   a plurality of storage modules, configured to perform classifying storage for the cargo to be sorted and transfer the cargo;
   a central controller, configured to control each module of the logistics sorting system so that each module can cooperate with each other as a whole;
   the transport module arranged in the front of the sorting module, the identification module arranged on the top of the transport module or on the top of the sorting module, the plurality of storage modules arranged on both sides of the sorting module accordingly one by one, the central controller connecting electrically with the transport module, the identification module, the sorting module, and the plurality of the storage modules respectively;
   wherein the plurality of storage modules include: an inner cart for storing and transferring the cargo of low processing frequency among the cargo to be sorted, and an outer cart for storing and transferring the cargo of high processing frequency among the cargo to be sorted, the inner cart arranged closer to the side where the sorting module is located than the outer cart arranged, the pull rod of the inner cart being longer than that of the outer cart such that the outer cart is sandwiched between the two pull rods of the inner cart.

2. The logistics sorting system as defined in claim 1, wherein the identification module comprises:
   a scanner for scanning the bar code of the cargo to be sorted to get the information of the cargo to be sorted;
   a vision sensor for obtaining the image information of the cargo to be sorted to determine a shape and a size attributes of the goods to be sorted.

3. The logistics sorting system as defined in claim 1, wherein the sorting module includes: a sorting platform and a sorting robot, the sorting platform configured to provide a temporary buffer space for the cargo to be sorted, assist the sorting robot to identify and sort the cargo to be sorted and process the problem cargo, the sorting robot configured to perform identification and sorting for the cargo to be sorted with the assistance of the sorting platform, so as to sort the cargo to the corresponding storage module.

4. The logistics sorting system as defined in claim 3, wherein the sorting platform includes a platform frame, a flipping platform, and a flipping power mechanism for driving the flipping platform to rotate, and the flipping platform and the flipping power mechanism respectively disposed on the platform frame.

5. The logistics sorting system as defined in claim 4, wherein the sorting platform further includes a vision assistant board arranged on the upper surface of the flipping platform, and the upper surface of the vision assistant board provided with a background layer and a coordinate mark arranged uniformly on the background layer, and the coordinate mark arranged in a different color from the background layer.

6. The logistics sorting system as defined in claim 3, wherein the sorting robot includes an end effector and a power mechanism that drives the end effector to perform three-dimensional motion in space, the end effector including an effector main body, the top of the effector main body provided with a power mechanism connector, so as the power mechanism to drive the main body, the bottom of the effector main body equipped with a parallel gripper module, and a detachable connection structure connected to any side of the main body for flexibly connecting a vacuum suction cup module or a sponge suction cup module to the main body.

7. The logistics sorting system as defined in claim 1, wherein the logistics sorting system further includes a space protection shelf for providing a safe working area for each module of the logistics sorting system and providing installation locations for both the identification module and a plurality of indicators of each system.

8. A logistics sorting method, based on the logistics sorting system of claim 1, wherein the logistics sorting method comprises the following steps:
   transporting the cargo to be sorted to the sorting module by the transport module;
   performing identification and sorting for the cargo to be sorted and processing the problem cargo by the sorting module with the help of the identification module;
   performing classifying storage and transferring for the cargo to be sorted by a corresponding storage module, after the sorting module sorts the cargo to be sorted successfully;
   recycling the problem cargo by the transport module so as to perform sorting again later, after the sorting module fails to sort the cargo to be sorted;
   the plurality of storage modules include a plurality of storage areas, wherein the logistics sorting method further comprises: obtaining the quantity of the cargoes of each storage area; and controlling the corresponding storage area to emit an acoustic, optical or electrical signal when the quantity of cargo of the corresponding storage area lies above a certain threshold value.

9. The logistics sorting method as defined in claim 8, wherein the sorting module includes a sorting platform for providing a temporary buffer space for the cargo to be sorted, wherein the logistics sorting method further comprises: detecting the sorting platform, and controlling the transport module to stop running when detecting the presence of the cargo on the sorting platform; otherwise, controlling the transport module to operate to deliver the cargo to the sorting platform.

10. The logistics sorting method as defined in claim 8, wherein the transport module includes a cargo placing area arranged in the front of a cargo delivery area, wherein the logistics sorting method further comprises: detecting the cargo placing area, and stopping placing cargo to the cargo placing area when detecting the presence of the cargo on the cargo placing area.

11. The logistics sorting method as defined in claim 9, wherein after the detecting the sorting platform, and the controlling the transport module to stop running when detecting the presence of the cargo on the sorting platform, the logistics sorting method further comprises:
   calculating the volume of cargo and scanning the identification code on the surface of the cargo;
   obtaining the destination of the cargo based on the identification code of the cargo;
   obtaining a corresponding end effector grasping plan according to the volume information of the cargo.

12. The logistics sorting method as defined in claim 10, wherein before the detecting the cargo placing area, and the stopping placing cargo to the cargo placing area when detecting the presence of the cargo on the cargo placing area, the logistics sorting method further comprises: moving the cargo to be sorted to a first preset position;
   detecting whether the cargo to be sorted is a single package;
   moving the cargo to be sorted to the cargo placing area when the cargo to be sorted is a single package.

13. The logistics sorting method as defined in claim 12, wherein the moving the cargo to be sorted to a first preset position further includes: controlling a first manipulator to obtain the cargo to be sorted and to place the cargo to be sorted on the transport module;
   controlling the transport module to move the cargo to be sorted to the first preset position;
   the moving the cargo to be sorted to the cargo to be sorted placing area, when the cargo to be sorted is a single package further comprising, controlling the transport module to keep moving until the cargo to be sorted is located at the cargo placing area.

14. The logistics sorting method as defined in claim 13, wherein the detecting whether the cargo to be sorted is a single package further includes:
   controlling a detector to capture the original picture of the cargo to be sorted;
   determining whether the cargo to be sorted is a single package based on the original picture and a pre-trained neural network.

15. The logistics sorting method as defined in claim 12, wherein before the moving the cargo to be sorted to the cargo placing area, the logistics sorting method further comprises: moving the cargo to be sorted to a second preset position and obtaining an identification code of the cargo to be sorted when the cargo to be sorted is a single package.

16. The logistics sorting method as defined in claim 15, wherein controlling an information reader to read the identification code of the cargo to be sorted when the cargo to be sorted pass the second preset position.

17. The logistics sorting system method as defined in claim 12, wherein moving the cargo to be sorted to an abnormal processing container when the cargo to be sorted is not a single package.

18. The logistics sorting system as defined in claim 1, wherein the transport module includes:
   a top conveyor, being configured to transport the cargo to the sorting module;
   a bottom conveyor, being configured to recycle and transport the problem cargo.

* * * * *